(12) United States Patent
Ukrainczyk et al.

(10) Patent No.: US 10,442,160 B2
(45) Date of Patent: Oct. 15, 2019

(54) METHODS OF FORMING SHAPED GLASS ARTICLES FROM GLASS SHEETS

(71) Applicant: CORNING INCORPORATED, Corning, NY (US)

(72) Inventors: Ljerka Ukrainczyk, Painted Post, NY (US); John Richard Ridge, Hammondsport, NY (US); Marianne Griesbach Park, Oneonta, NY (US)

(73) Assignee: CORNING INCORPORATED, Corning, NY (US)

( * ) Notice: Subject to any disclaimer, the term of this patent is extended or adjusted under 35 U.S.C. 154(b) by 70 days.

(21) Appl. No.: 15/504,133

(22) PCT Filed: Aug. 17, 2015

(86) PCT No.: PCT/US2015/045457
§ 371 (c)(1),
(2) Date: Feb. 15, 2017

(87) PCT Pub. No.: WO2016/028660
PCT Pub. Date: Feb. 25, 2016

(65) Prior Publication Data
US 2017/0274626 A1 Sep. 28, 2017

Related U.S. Application Data

(60) Provisional application No. 62/039,552, filed on Aug. 20, 2014.

(51) Int. Cl.
*C03B 23/035* (2006.01)
*B32B 17/06* (2006.01)

(52) U.S. Cl.
CPC ........ *B32B 17/064* (2013.01); *C03B 23/0352* (2013.01); *C03B 23/0355* (2013.01); *C03B 23/0357* (2013.01); *Y02P 40/57* (2015.11)

(58) Field of Classification Search
CPC .......................... C03B 23/035; C03B 23/0352
See application file for complete search history.

(56) References Cited

U.S. PATENT DOCUMENTS

| 2,377,849 A | 6/1945 | Binkert et al. |
| 3,338,696 A | 8/1967 | Dockerty |

(Continued)

FOREIGN PATENT DOCUMENTS

| CN | 1179130 A | 4/1998 |
| CN | 103723548 A | 4/2014 |

(Continued)

OTHER PUBLICATIONS

Corning Gorilla Glass Product Information sheet (https://www.corning.com/microsites/csm/gorillaglass/PI_Sheets/CGG_PI_Sheet_Gorilla%20Glass%203.pdf) accessed Sep. 30, 2018.*

(Continued)

*Primary Examiner* — Jason L Lazorcik
(74) *Attorney, Agent, or Firm* — Timothy M. Schaeberle

(57) ABSTRACT

A method of forming a 3D glass article from a glass sheet includes locating the glass sheet on a mold assembly including a mold surface with a 3D surface profile corresponding to that of the 3D glass article. The glass sheet is heated to a forming temperature. The forming temperature is greater than a temperature of the mold surface. The heated glass sheet is forced onto the mold surface by applying a pressurized gas to a first surface of the glass sheet opposite the mold surface to conform the glass sheet to the mold surface with the glass sheet at the forming temperature that is greater than the temperature of the mold surface.

14 Claims, 9 Drawing Sheets

(56) References Cited

U.S. PATENT DOCUMENTS

| | | |
|---|---|---|
| 3,682,609 A | 8/1972 | Dockerty |
| 5,759,220 A | 6/1998 | Boaz |
| 5,804,719 A | 9/1998 | Didelot et al. |
| 7,551,454 B2 | 6/2009 | Wuchse et al. |
| 8,429,937 B2 | 4/2013 | Malach et al. |
| 8,652,643 B2 | 2/2014 | Higuchi |
| 2006/0231837 A1 | 10/2006 | Wuschse et al. |
| 2009/0110882 A1 | 4/2009 | Higuchi |
| 2009/0117332 A1* | 5/2009 | Ellsworth ............ C03B 23/0357 428/156 |
| 2010/0000259 A1* | 1/2010 | Ukrainczyk ......... C03B 23/0235 65/104 |
| 2010/0055395 A1 | 3/2010 | Ukrainczyk |
| 2012/0297828 A1 | 11/2012 | Bailey et al. |
| 2012/0327568 A1* | 12/2012 | Shedletsky .......... C03C 17/3417 361/679.01 |
| 2013/0081428 A1* | 4/2013 | Liu .......................... C03B 40/00 65/106 |
| 2013/0098110 A1 | 4/2013 | Bailey et al. |
| 2013/0189486 A1 | 7/2013 | Wang et al. |
| 2013/0298608 A1* | 11/2013 | Langsdorf ............ C03B 23/0258 65/103 |
| 2013/0330495 A1 | 12/2013 | Maatta et al. |
| 2014/0335322 A1* | 11/2014 | Luo ...................... C03B 23/0307 428/177 |
| 2015/0111016 A1 | 4/2015 | Fisher et al. |
| 2016/0303783 A1 | 10/2016 | Koganezawa et al. |
| 2016/0376184 A1* | 12/2016 | Atkins-Barratt ....... C03B 23/037 65/102 |
| 2017/0121210 A1* | 5/2017 | Rai ..................... C03B 23/0357 |
| 2018/0072606 A1* | 3/2018 | Chou .................. C03B 23/0357 |
| 2018/0237327 A1* | 8/2018 | Chae .................. C03B 23/0357 |

FOREIGN PATENT DOCUMENTS

| | | |
|---|---|---|
| DE | 2440416 A1 | 3/1976 |
| DE | 102004011117 A1 | 9/2005 |
| FR | 1015099 | 8/1952 |
| JP | S6236029 A | 2/1987 |
| JP | 2001018598 A | 1/2001 |
| JP | 2002248623 A | 9/2002 |
| JP | 2009067653 A | 4/2009 |
| WO | 2006050891 A2 | 5/2006 |
| WO | 2010064083 | 6/2010 |
| WO | 2011155403 A1 | 12/2011 |
| WO | 2012118612 | 9/2012 |
| WO | 2013184897 | 12/2013 |

OTHER PUBLICATIONS

Patent Cooperation Treaty International Notification of Transmittal of the International Search Report and The Written Opinion of the International Searching Authority, international application No. PCT/US2015/045457: dated Jan. 25, 2016, 19 pages.
http://www.toshiba-machine.co.jp/en/product/nano/lineup/gmp/shiyo.html, downloaded Feb. 1, 2017.
English Translation of TW104115277 Search Report dated Aug. 16, 2018, Taiwan Patent Office, 1 Pg.
English Translation of CN201580044641.X First Office Action dated Mar. 1, 2019, China Patent Office, 9 Pgs.

* cited by examiner

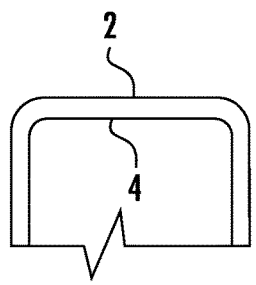
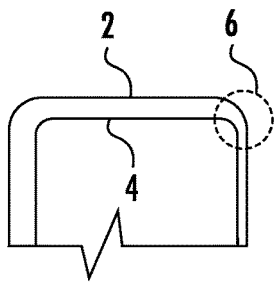
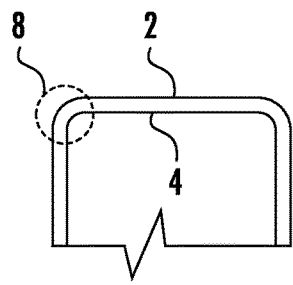
FIG. 1A  FIG. 1B  FIG. 1C
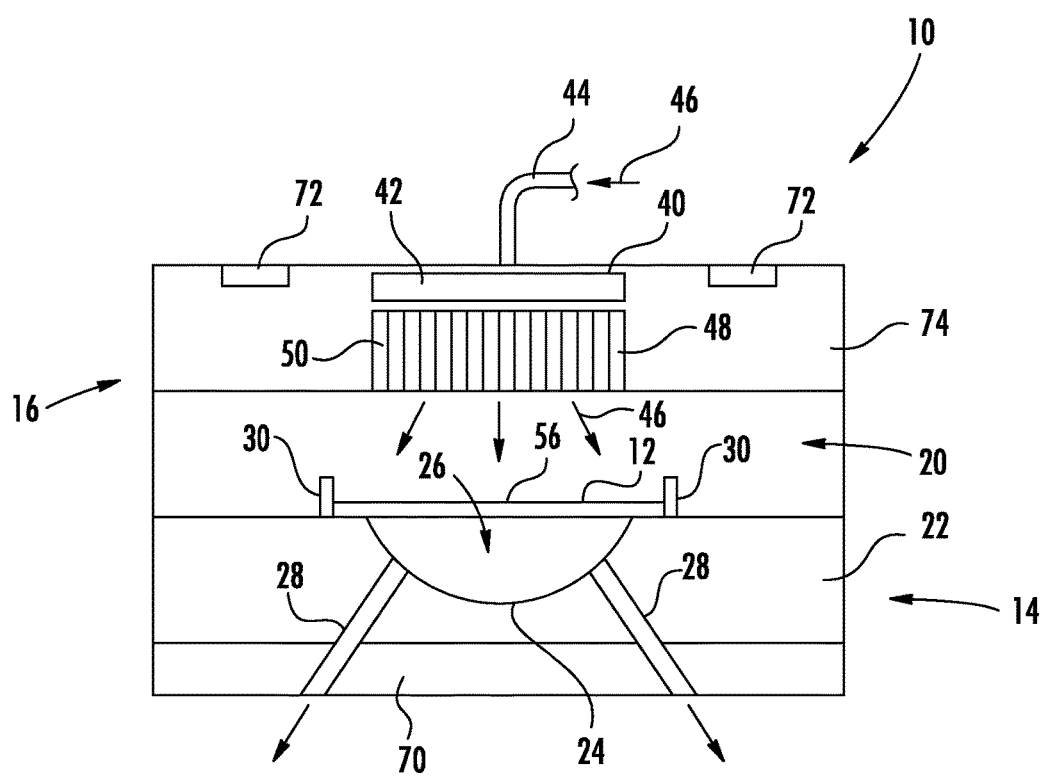
FIG. 2

METHODS OF FORMING SHAPED GLASS ARTICLES FROM GLASS SHEETS

This application is a national stage entry of International Patent Application Serial No. PCT/US15/45457 filed on Aug. 17, 2015, which claims the benefit of priority to U.S. Application No. 62/039,552 filed on Aug. 20, 2014 the content of which is incorporated herein by reference in its entirety.

FIELD

The present disclosure relates to forming shaped glass articles from glass sheets.

BACKGROUND

There is demand for three-dimensional (3D) glass covers for portable electronic devices, such as laptops, tablets and smart phones. A particularly desirable 3D glass cover has a combination of a two-dimensional (2D) surface, for interaction with a display, and a 3D surface, for wrapping around the edge of the display. The 3D surface may be an undevelopable surface, i.e., a surface that cannot be unfolded or unrolled onto a plane without distortion, and may include any combination of bends, corners, and curves. The bends may be tight and steep. The curves may be irregular. Such 3D glass covers are complex and difficult to make with precision.

For thicker glass sheets, e.g., greater than 0.3 mm, thermal reforming has been used to form 3D glass articles from 2D glass sheets. Thermal reforming involves heating a 2D glass sheet to a forming temperature and then reforming the 2D glass sheet into a 3D shape. Where the reforming is done by sagging or pressing the 2D glass sheet against a mold, it is desirable to keep the temperature of the glass below the softening point of the glass to maintain a good glass surface quality and to avoid a reaction between the glass and the mold. Below the softening point, the glass has a high viscosity and requires a high pressure to be reformed into complex shapes such as bends, corners, and curves. In traditional glass thermal reforming, a plunger is used to apply the needed high pressure. The plunger contacts the glass and presses the glass against the mold.

To achieve a 3D glass article with a uniform thickness, the gap between the plunger surface and the mold surface must be uniform while the plunger presses the glass against the mold. FIG. 1A shows an example of a uniform gap between a plunger surface 2 and a mold surface 4. However, it is often the case that the gap between the plunger surface and the mold surface is not uniform due to small errors in mold machining and alignment errors between the mold and plunger. FIG. 1B shows a non-uniform gap (e.g., at 6) between the plunger surface 2 and mold surface 4 due to misalignment of the plunger with the mold. FIG. 1C shows a non-uniform gap (e.g., at 8) between the plunger surface 2 and mold surface 102 due to machining errors in the mold surface 4.

Non-uniform gaps result in over-pressing in some areas of the glass and under-pressing in other areas of the glass. Over-pressing can create glass thinning that can show up as a noticeable optical distortion in the 3D glass article. Under-pressing can create wrinkles in the 3D glass article, particularly at complex areas of the glass article including bends, corners, and curves. Small machining errors, e.g., on the order of 10 microns, can result in non-uniform gaps that would produce over-pressing and/or under-pressing. Unavoidable thermal expansion of the plunger surface, mold surface, glass, or other equipment involved in the forming can also affect uniformity of the gap. During pressing, the plunger can also stretch the glass so that the thickness of the glass between the plunger surface and mold surface changes. Therefore, even if the gap between the plunger surface and the mold surface is perfect, the stretching of the glass can result in a 3D glass article having a nonuniform thickness. The mold surface or the plunger surface may be designed to compensate for the expected change in glass thickness as a result of stretching. However, this can result in a nonuniform gap between the plunger surface and mold surface, which as noted above can result in over-pressing in some areas of the glass and under-pressing in other areas of the glass.

Accordingly, there is a need for methods of reliably forming 3D glass articles from 2D sheets, particularly where the 2D sheets are formed of ultra-thin, flexible glass having thicknesses of no more than about 0.3 mm.

SUMMARY

Forming processes disclosed herein can enable forming high-quality, undevelopable shapes from glass sheets (e.g., flexible glass sheets) without optical distortion and tight dimensional control. These 3D glass articles can be laminated with plastic on one or each side to provide a variety of properties such as scratch and wear protection.

Glass typically has better scratch and wear resistance than plastic materials. Glass can also be easily cleaned without surface damage compared to plastic materials, and objects do not embed in glass like they can plastics. Many transparent polymer products like visors, sunglasses, skiing goggles, prescription goggles, etc. are undevelopable shapes and are made from polycarbonates or similar materials. As disclosed herein, by forming glass sheets into these undevelopable shapes and laminating plastic materials thereto, the lifetime, transparency and maintenance of the finished articles can be increased. The 3D articles may also be used to form bent OLED displays or other electronic products.

Additional features and advantages will be set forth in the detailed description which follows, and in part will be readily apparent to those skilled in the art from the description or recognized by practicing the embodiments as exemplified in the written description and the appended drawings. It is to be understood that both the foregoing general description and the following detailed description are merely exemplary of the subject matter disclosed, and are intended to provide an overview or framework to understanding the nature and character of the subject matter as it is claimed.

The accompanying drawings are included to provide a further understanding of principles of the disclosure, and are incorporated in and constitute a part of this specification. The drawings illustrate one or more embodiment(s), and together with the description serve to explain, by way of example, principles and operation of the disclosure. It is to be understood that various features of the embodiments disclosed in this specification and in the drawings can be used in any and all combinations. By way of non-limiting example the various features of the disclosure may be combined with one another according to the following aspects.

According to a first aspect, there is provided a method of forming a 3D glass article from a glass sheet that includes locating the glass sheet on a mold assembly including a mold surface with a 3D surface profile corresponding to that of the 3D glass article. The glass sheet is heated to a forming temperature. The forming temperature is greater than a temperature of the mold surface. The heated glass sheet is forced onto the mold surface by applying a pressurized gas to a first surface of the glass sheet opposite the mold surface to conform the glass sheet to the mold surface with the glass sheet at the forming temperature that is greater than the temperature of the mold surface.

According to a second aspect, there is provided the method of aspect 1, wherein the glass sheet is a flexible glass sheet comprising a thickness of no more than about 0.3 mm.

According to a third aspect, there is provided the method of aspect 1 or aspect 2, wherein the step of forcing the heated glass sheet onto the mold surface includes applying a vacuum to a second surface of the glass sheet opposite the first surface.

According to a fourth aspect, there is provided the method of any of aspects 1-3, wherein the pressurized gas is heated.

According to a fifth aspect, there is provided the method of any of aspects 1-4, further comprising sealing the mold assembly with a pressure cap assembly to form a pressurized chamber therebetween, wherein the pressurized gas is between about 10 psi and about 60 psi.

According to a sixth aspect, there is provided the method of any of aspects 5, further comprising heating the pressure cap assembly to a temperature of between about 800° C. and about 950° C. thereby radiatively heating the glass sheet.

According to a seventh aspect, there is provided the method of any of aspects 1-6, wherein the forming temperature of the glass sheet is at least about 25° C. higher than the temperature of the mold surface during the step of forcing the heated glass sheet onto the mold surface.

According to a eighth aspect, there is provided the method of any of aspects 1-7, wherein the forming temperature of the glass sheet is between about 25° C. and about 100° C. higher than the temperature of the mold surface during the step of forcing the heated glass onto the mold surface.

According to an ninth aspect, there is provided the method of aspects 1-8, further comprising cooling the glass sheet after the step of forcing the heated glass sheet onto the mold surface to form the 3D glass article.

According to a tenth aspect, there is provided the method of aspects 1-9, further comprising applying a polymer layer to the 3D glass article.

According to an eleventh aspect, there is provided an apparatus for forming a 3D glass article from a glass sheet including a mold assembly having a mold surface with a 3D surface profile corresponding to that of the 3D glass article. A pressure cap assembly engages the mold assembly to provide a pressurized cavity therebetween. The pressure cap assembly includes a heater configured to heat the glass sheet to a forming temperature that is greater than a temperature of the mold surface.

According to a twelfth aspect, there is provided the apparatus of aspect 11, wherein the glass sheet is a flexible glass sheet having a thickness of no more than 0.3 mm.

According to a thirteenth aspect, there is provided the apparatus of aspect 11 or aspect 12, wherein the heater is configured to heat the glass sheet to the forming temperature of at least about 25° C. higher than the temperature of the mold surface.

According to a fourteenth aspect, there is provided the method of any of aspects 11-13, wherein the heater is configured to heat the flexible glass sheet to the forming temperature of between about 25° C. and about 100° C. higher than the temperature of the mold surface.

According to a fifteenth aspect, there is provided the method of any of aspects 11-14, wherein the mold surface defines a mold cavity and wherein one or more ports intersect the mold surface for applying negative pressure within the mold cavity.

According to a sixteenth aspect, there is provided the method of any of aspects 11-15, wherein the pressure cap assembly includes a plenum with a plenum chamber for receiving the pressurized gas and a flow channel structure mounted adjacent the plenum chamber and spaced from the mold surface.

According to a seventeenth aspect, there is provided the method of any of aspects 11-16, wherein the pressure cap assembly is removable from the mold assembly.

According to an eighteenth aspect, there is provided a 3D glass article formed from a glass sheet. The article includes a glass layer having a non-planar formation formed using a mold assembly having a mold surface with a 3D surface profile corresponding to that of the 3D glass article. A polymer layer is applied to a surface of the glass layer with the glass layer in the non-planar formation. The glass sheet is formed into the non-planar formation at a forming temperature that is higher than a temperature of the mold surface.

According to a nineteenth aspect, there is provided the article of aspect 18, wherein the polymer layer is an overmolded layer that is overmolded onto the glass layer.

According to a twentieth aspect, there is provided the article of aspect 18 or 19, wherein the polymer layer is laminated onto the glass layer.

According to a twenty-first aspect, there is provided the article of any of aspects 18-20, further comprising an adhesive layer between the polymer layer and the glass layer.

According to a twenty-second aspect, there is provided the article of any of aspects 18-21, wherein the polymer layer introduces a compressive stress in the glass layer.

According to a twenty-third aspect, there is provided the article of any of aspects 18-22, wherein the glass layer has a thickness of no more than about 0.3 mm.

BRIEF DESCRIPTION OF THE DRAWINGS

FIG. 1A is a schematic illustration of a uniform gap between a plunger and a mold;

FIG. 1B is a schematic illustration of a non-uniform gap between a plunger and a mold;

FIG. 1C is a schematic illustration of a non-uniform gap between a plunger and a mold;

FIG. 2 is a schematic illustration of an embodiment of an apparatus for forming a 3D glass article from a flexible glass sheet;

DETAILED DESCRIPTION

Figure 3:
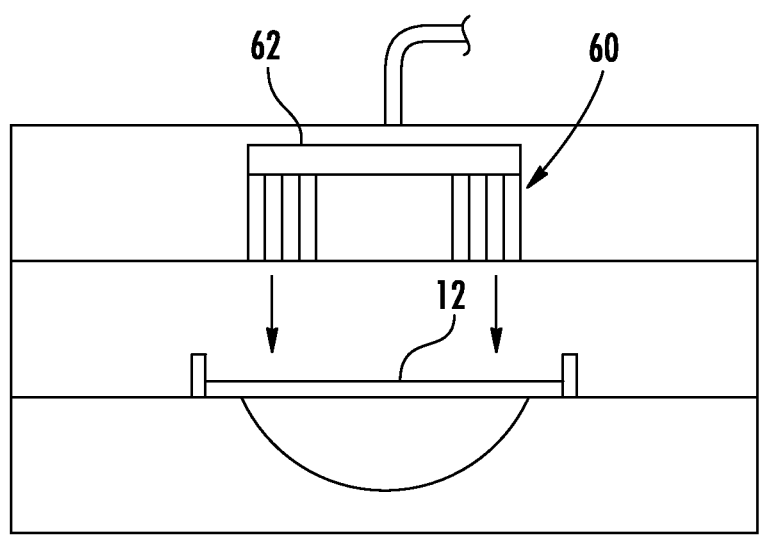
FIG. 3 is a schematic illustration of another embodiment of an apparatus for forming a 3D glass article from a flexible glass sheet.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Flexible glass substrates can allow for curved or conformable shapes to be used in electronics, packaging and architectural applications, as examples. Embodiments described herein relate generally to forming 3D glass articles from 2D glass sheets (e.g., flexible glass sheets) using hot pressurized gas that is delivered from a pressure cap assembly that is at a greater temperature than a mold temperature to provide radiative heating of the glass sheet during the forming process. The hot pressurized gas may be applied uniformly to the glass sheet or may be applied differentially, for example, in greater concentration to areas of the glass sheet needing higher forming pressures, such as areas of the glass sheet including bends, corners and curves. In general, the process may include placing the glass sheet on a mold assembly over a mold cavity, preheating the pressure cap assembly (or at least a portion thereof, to a preselected temperature and heating the glass sheet using radiative heating from the pressure cap assembly thereby providing a temperature differential between the glass sheet and the mold assembly such that the mold assembly is cooler than the glass sheet, applying hot pressurized gas to complete the 3D shape of the glass article and cooling the 3D glass article.

The 3D glass articles generally have a non-planar formation. As used herein, the term "non-planar formation" refers to a 3D shape where at least a portion of the glass article extends outwardly or at an angle to a plane defined by the original, laid out configuration of the flexible glass sheet. The 3D glass articles formed from the glass sheets may have one or more elevations or curve portions. The 3D glass articles can hold the non-planar formation as a free-standing object, without any external force due to the forming process.

In some embodiments, the glass sheet is a flexible glass sheet. The flexible glass sheets described herein may have a thickness of about 0.3 mm or less including but not limited to thicknesses of, for example, about 0.01-0.05 mm, about 0.05-0.1 mm, about 0.1-0.15 mm, about 0.15-0.3 mm, including 0.3, 0.275, 0.25, 0.225, 0.2, 0.19, 0.18, 0.17, 0.16, 0.15, 0.14, 0.13, 0.12, 0.11, 0.10, 0.09, 0.08 0.07, 0.06, 0.05, 0.04, 0.03, 0.02, or 0.01 mm, for example. The glass sheets may be formed of glass, a glass ceramic, a ceramic material or composites thereof; for the sake of convenience in reference only, the terms "flexible glass sheet," "glass layer" or "flexible glass substrate" may be used throughout the specification, wherein such a substrate or layer may instead be made from any of these materials. A fusion process (e.g., down draw process) that forms high quality glass substrates can be used to form the glass sheets. Glass sheets produced in a fusion process may have surfaces with superior flatness and smoothness when compared to glass sheets produced by other methods. The fusion process is described in U.S. Pat. Nos. 3,338,696 and 3,682,609. Other suitable glass substrate forming methods include float processes, updraw and slot draw methods.

Referring to FIG. 2, a method and apparatus 10 for forming a 3D glass article from a 2D flexible glass sheet 12 is shown. The apparatus 10 includes a mold assembly 14 and a pressure cap assembly 16 that is connected to the mold assembly 14 to form a pressurized forming cavity 20 therebetween. The mold assembly 14 includes a mold body 22 having a mold surface 24 having a 3D surface profile that corresponds to the desired 3D shape of the glass article to be formed. The mold surface 24 is illustrated as being concave and defining a mold cavity 26; however, other shapes may be used, such as convex, undulations, flat and curved areas, etc. The flexible glass sheet 12 is placed on the mold body 22 in a position to sag into the mold cavity 26 or against the mold surface 24. Ports or holes 28 may be provided in the mold body 22. The ports 28 may run from the exterior of the mold body 22 to the mold surface 24. In one embodiment, the ports 28 are located at the corners of the mold surface 24. In other embodiments, the ports 28 may be located at the corners and bottom of the mold surface 24 or just at the bottom of the mold surface 24. The ports 28 may serve as vacuum ports, to apply vacuum to the mold cavity 26, or exhaust ports, to withdraw gas trapped in the mold cavity 26.

Alignment pins 30 may be provided on the mold body 22 to assist in aligning the flexible glass sheet 12 with the mold cavity 20.

The mold body 22 may be made of a material that can withstand high temperatures, such as would be encountered while forming the glass article from the flexible glass sheet. The mold material may be one that will not react with (or not stick to) the glass under the forming conditions, or the mold surface 24 may be coated with a coating material that will not react with (or not stick to) the glass under the forming conditions. In one embodiment, the mold body 22 is made of a non-reactive carbon material, such as graphite, and the mold surface 24 is highly polished to avoid introducing defects into the glass when the mold surface 24 is in contact with the glass. In another embodiment, the mold body 22 is made of a dense ceramic material, such as silicon carbide, tungsten carbide, and silicon nitride, and the mold surface 24 is coated with a non-reactive carbon material, such as graphite. In another embodiment, the mold body 22 is made of a superalloy, such as Inconel 718, Inconel 600, a nickel-chromium alloy, and the mold surface 24 is coated with a hard ceramic material, such as titanium aluminum nitride. In one embodiment, the mold surface 24, with or without a coating material, has a surface roughness Ra of no more than about 10 nm. In embodiments in which a carbon material is used for the mold body 22 or a carbon coating material is used for the mold surface 24, the forming of the glass article can be carried out in an inert atmosphere.

The pressure cap assembly 16 is mounted on the top of the mold assembly 14. When the pressure cap assembly 16 is mounted on the mold assembly 14, the pressure cavity 20 is formed therebetween. The pressure cap assembly 16 includes a plenum 40 that includes a plenum chamber 42, which is connected via a conduit 44 to a source of hot pressurized gas 46, which may be an inert gas such as nitrogen or any other suitable gas. The pressure cap assembly 16 includes a flow channel structure 48, which is mounted below the plenum chamber 42 and positioned above the mold body 22. The flow channel structure 48 may be, for example, a perforated plate including flow channels 50 through which the pressurized gas 46 in the plenum chamber 42 can be directed into the pressure cavity 20 and directed toward the mold surface 24. The pressure cap assembly 16 including the flow channel structure 48 may be formed of materials that would not generate contaminants under the conditions under which the flexible glass sheet 12 will be reformed into the shaped article.

The pressure cavity 20 may be sealed between the pressure cap assembly 16 and the mold assembly 14 before delivering hot pressurized gas 46 into the pressure cavity 20 through the plenum 40 and flow channel structure 48. The pressure cavity 20 may be sealed by applying a force to the pressure cap assembly 16 so that the pressure cap assembly 16 clamps down on top of the mold body 22. A ram or other suitable device may be used to apply the force. To maintain the sealed condition, the sealing pressure may be greater than the pressure of the hot pressurized gas 46 delivered into the pressure cavity 20.

In the illustrated embodiment, the flow channel structure 48 occupies the entire bottom of the plenum chamber 42 and directs the hot pressurized gas 46 across an entire top surface 56 of the flexible glass sheet 12. If the distribution and sizes of the holes in the flow channel structure 48 are uniform, the hot pressurized gas 46 will be directed substantially uniformly across the entire surface 56 of the flexible glass sheet 12. FIG. 3 shows an alternative arrangement where a flow channel structure 60 is located at an edge of a plenum chamber 62 and allows for differential application of the hot pressurized gas 46 to the top surface 56 of the flexible glass sheet 12. The flow channel structure 60 may be annular in shape. Alternatively, a plurality of flow channel structures arranged along the edge of the plenum chamber 62 may be used. In the arrangement shown in FIG. 3, the flow channel structure 60 will direct hot pressurized gas to the periphery of the flexible glass sheet 12. This periphery may be where high forming pressure is needed, e.g., where bends, corners, or curves will be formed. In general, the position of the flow channel structure on the plenum will determine the focus of the hot pressurized gas delivered through the flow channel structure, and the location of the flow channel structure as well as the size and spacing of the holes in the flow channel structure may be tailored to the 3D shape to be formed. A flow channel structure such as shown in FIG. 3 that directs hot pressurized gas to a selected area of a flexible glass sheet on a mold or that directs hot pressurized gas differentially across the flexible glass sheet on the mold body may be referred to as a directional flow channel structure.

In some embodiments, the pressure cavity 20 may not be sealed prior to delivering hot pressurized gas 46 into the pressure cavity 20. A directional flow channel structure, such as flow channel structure 60 in FIG. 3, may be positioned within a small distance (e.g., no more than about 5 mm) from the flexible glass sheet 12. The small distance can provide a directional jet applied through the directional flow channel structure to be confined to the desired area of the flexible glass sheet 12 requiring high pressure forming. The high velocity of the directional jet may be used to create point or line pressure in the desired area of the flexible glass sheet 12. Because the pressure cavity 20 is not sealed in this case, the equilibrium pressure in the pressure cavity 20 is not established. Thus, only the desired area of the flexible glass sheet 12 can receive the high velocity gas get pressure.

The mold assembly 14 may be placed on a vacuum chuck 70 as shown in FIG. 2. In other embodiments, a vacuum chuck 70 may not be used. Heating elements 72 may be located at the pressure cap assembly 16 for heating the pressurized gas 46 and a pressure cap body 74. Heating the pressure cap body 74 can allow for radiative heating of the flexible glass sheet 12. In some embodiments, the heaters may be IR heaters positioned to deliver radiative heat to the flexible glass directly or indirectly through the pressure cap body 74. In some embodiments, a temperature differential is provided between the flexible glass sheet 12 and the mold body 22 at the mold surface 24. For example, the temperature differential is at least about 25° C., such as at least about 50° C., such as between about 25° C. and about 100° C. during the glass article forming process. Any suitable heaters may be used, such as IR or resistive heaters.

Figure 4:
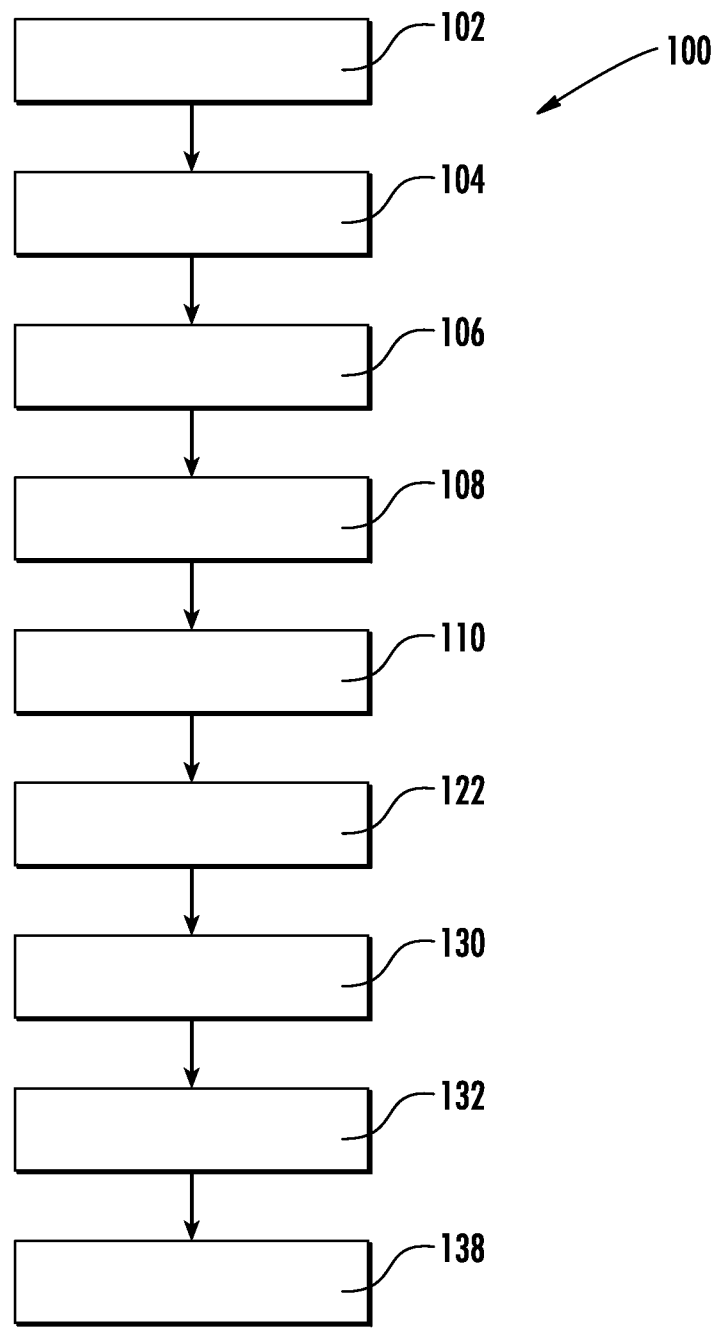
FIG. 4 illustrates an exemplary method of forming a 3D glass article.
Figure 5:
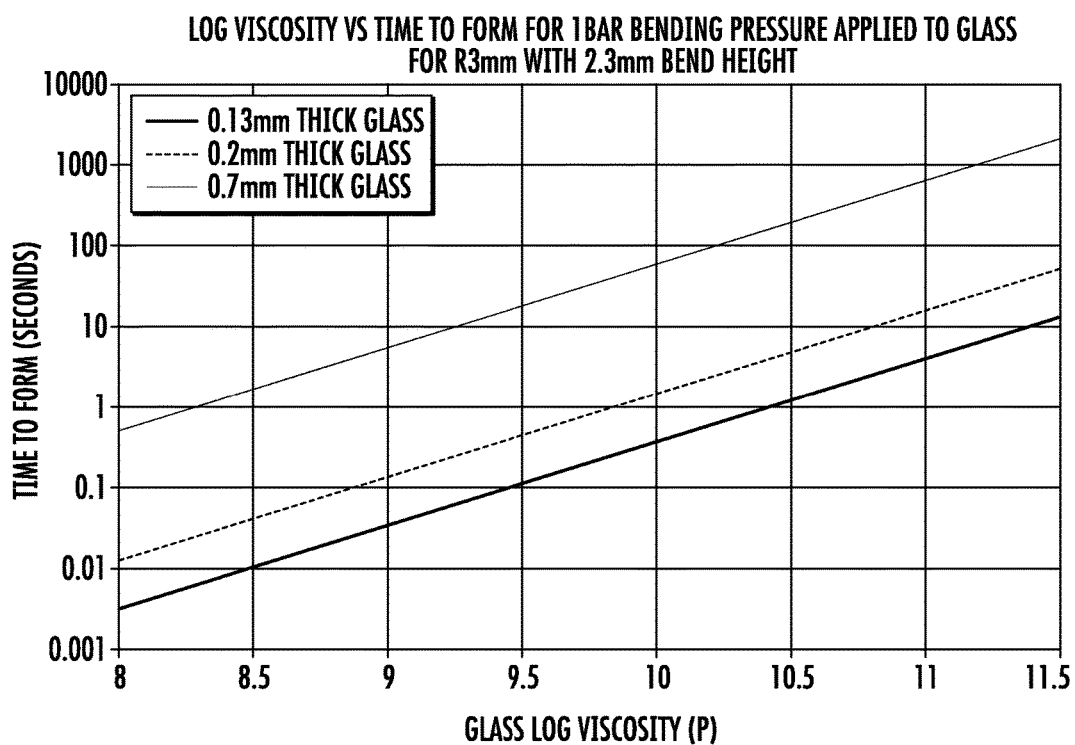
FIG. 5 illustrates an exemplary relationship between time to form and glass viscosity of dish shapes having a bend radius of 3 mm for glass sheets having 0.13 mm, 0.2 mm and 0.7 mm thickness.

Referring to FIG. 4, an exemplary method 100 of forming a 3D glass article is illustrated. In this embodiment, a continuous flexible glass ribbon may be formed at step 102 using any suitable process, such as a fusion draw process. At step 104, a flexible glass sheet may be removed from the continuous flexible glass ribbon using any suitable cutting process, such as laser cutting, scoring and breaking, etc. At step 106, it may be desirable to edge strengthen the flexible glass sheet, for example, through polishing, etching, edge coating, etc., particularly at the cut edge. At step 108, the flexible glass sheet may be preheated before the flexible glass sheet is placed in the mold assembly 14 (e.g., to a temperature below the forming temperature). In other embodiments, the flexible glass sheet may be preheated within the mold assembly 14. The flexible glass sheet may be placed in the pressure cavity 20, between the mold assembly 14 and the pressure cap assembly 16 at step 110. In some embodiments, the mold body 22 may be preheated, before placement of the flexible glass sheet thereon. In some embodiments, alignment pins 30 may be used to locate the flexible glass sheet on the mold body 22. After locating the flexible glass sheet on the mold, the flexible glass sheet may be heated using mid-IR heating elements or emitter plate, as described above to a forming temperature corresponding to a desired glass viscosity or viscosity range. The mold assembly 14 is then moved or indexed under the pressure cap assembly 16. FIG. 5 illustrates an exemplary relationship between time to form and glass viscosity of dish shapes having a bend radius of 3 mm for glass sheets having 0.13 mm, 0.2 mm and 0.7 mm thickness. As can be seen, thinner glass sheets can be reformed at higher viscosities compared to thicker glass sheets.

In one embodiment, the flexible glass sheet and mold body 22 are heated such that they are both at the same temperature by the time the forming of the flexible glass sheet into the 3D glass article starts. For this type of heating, the mold body 22 may be made of a non-reactive carbon material such as graphite or of a dense ceramic material coated with a carbon coating material. The heating may take place in an inert atmosphere. In another embodiment, flexible glass sheet may be heated while on the mold body 22 so that the temperature of the mold body 22 is lower than that of the flexible glass sheet, for example, the temperature of the mold body 22 may be 25° C. to 100° C. lower than the temperature of the flexible glass sheet. A mid-IR heater may be used for this heating. The mold body 22 may be made of a superalloy with a hard ceramic coating. With this material, the heating can take place in an inert or non-inert atmosphere.

After heating the flexible glass sheet and the mold body 22, a vacuum is applied to the mold cavity 26 to draw a bottom surface of the flexible glass sheet against the mold surface 24 and seal the flexible glass sheet to the mold surface 24 at step 122. Before the vacuum is applied, the flexible glass sheet may already have started sagging against the mold surface 24 due to gravity. The vacuum applied may be in a range of 2 to 10 in-Hg in one embodiment. Hot pressurized gas 46 is applied to the top surface of the partially-shaped flexible glass sheet through the plenum 40 and pressure chamber 42. The hot pressurized gas 46 provides the pressure needed to fully conform the flexible glass sheet to the mold surface 24, thereby forming the 3D glass article. The temperature of the hot pressurized gas is in the previously mentioned temperature range corresponding to a glass viscosity range of $10^7$ Poise to $10^{11}$ Poise. It may be desirable for the pressure cap assembly 16 and/or $N_2$ temperature to be at a temperature greater than 800° C., such as between 870° C. and 950° C. so that the flexible glass sheet is radiatively heating during the pressure forming allowing the flexible glass sheet to stay at low viscosity and conform to the mold shape at a faster rate. The temperature of the hot pressurized gas may be the same as or may be different from the temperature of the flexible glass sheet. In one embodiment, the temperature of the hot pressurized gas is within 80° C. of the temperature of the flexible glass sheet. The temperature of the hot pressurized gas may be the same as, or higher than or lower than the temperature of the flexible glass sheet. Bursts of hot pressurized gas at a temperature higher than the temperature of the flexible glass sheet may be selectively applied to the flexible glass sheet. The flow channel structure 60 may be designed such that the bursts of hot pressurized gas are directionally applied, i.e., only to areas of the flexible glass sheet where the bursts are needed. Gas pressures to form a 3D shape may be comparable to plunger pressure used in contact forming. Depending on the 3D shape to be formed and the glass viscosity, this pressure may be in the range of 10 psi to 60 psi.

Prior to applying the hot pressurized gas 46 to the flexible glass sheet, the pressure cavity 20 may be sealed, as already described above. The pressure cavity 20 may be sealed before, during, or after heating the flexible glass sheet if the flexible glass sheet is heated by radiation from the pressure cap assembly 16. Alternatively, if the pressure cavity 20 is to be sealed, the pressure cavity 20 should be sealed after heating the flexible glass sheet if the flexible glass sheet is heated directly on the mold body 22 using radiation. The vacuum can be applied to the mold cavity 26 a few seconds before the hot pressurized gas 46 is applied to the flexible glass sheet. The vacuum can be maintained partially or through the entire duration of applying the hot pressurized gas 46 to the glass sheet, in which case the vacuum can help maintain the position of the flexible glass sheet on the mold body 22 so that the flexible glass sheet does not move when the hot pressurized gas 46 is applied and so that pressurized gas cannot flow beneath the flexible glass sheet. If the starting flexible glass sheet is larger than the mold cavity 26 so that it covers the mold cavity 26, then the flexible glass sheet may be formed into the 3D glass article without use of vacuum. While forming with or without vacuum, the ports in the mold cavity 26 may be used to exhaust gas trapped in the mold cavity 26.

After forming the 3D glass article, the flow of hot pressurized gas 46 to the pressure cavity 20 is stopped or replaced with flow of colder pressurized gas at step 130. Then, the 3D glass article is cooled to near the annealing point using or not using colder pressurized gas. The colder pressurized gas may assist in more rapid cooling of the 3D glass article. In one embodiment, when the colder pressurized gas is used in cooling the 3D glass article, the temperature of the colder pressurized gas is selected from a temperature range corresponding to the glass transition temperature plus or minus 10° C. In another embodiment, when the colder pressurized gas is used in cooling the 3D glass article, the temperature of the colder pressurized gas is adjusted to match the temperature of the mold body 22 during the cooling. This may be achieved by monitoring the temperature of the mold body 22 with sensors such as thermocouples and using the output of the sensors to adjust the temperature of the colder pressurized gas. The pressure of the colder pressurized gas may be less than or the same as the pressure of the hot pressurized gas. The cooling of the 3D glass article is such that the temperature difference (delta T) across the thickness of the glass article, along the length of the glass article, and along width of the glass article is minimized. The mold assembly can also be cooled by pressurized gas to accelerate mold cooling.

Delta T may be less than 10° C. across the thickness of the glass article and along the length and width of the glass article. The lower the delta T during cooling, the lower the stress in the glass article. If high stress is generated in the glass article during cooling, the glass article can warp in response to stress. As such, it may be desirable to avoid generating high stress in the glass article during cooling. The 3D glass article can be cooled convectively by applying controlled-temperature gas flow on both sides of the 3D glass article. Colder pressurized gas, as described above, can be applied to the top surface of the 3D glass article through the plenum 40 and plenum chamber 42, and controlled-temperature gas flow, which may have similar characteristics to the colder pressurized gas, can be applied to the bottom surface of the 3D glass article through the ports in the mold cavity 26. The pressure of the gas supplied through the ports may be such that a net force is created that lifts the 3D glass article from the mold cavity 26 during the cooling at step 132. The mold body 22 can cool at a much slower rate than the glass due to the mold body 22 having a larger thermal mass than the glass. This slow cooling of the mold body 22 can generate a large delta T across the thickness of the glass. Lifting the glass from the mold body 22 during the cooling can help avoid this large delta T.

Gentle contours can be formed at relatively high glass viscosities, e.g., $10^9$ Poise to $10^{11}$ Poise, while tight bends and sharp corners may be formed at lower viscosities, e.g., between $10^7$ Poise and $10^8$ Poise. The lower viscosities allow the glass to better conform to the mold. However, it can be challenging to achieve good glass surface cosmetics at low viscosities because it can be easier to imprint defects on the glass surface. Forming at low viscosities can, for example, cause glass reboil, which can generate orange peel. The vacuum or exhaust ports in the mold surface can be imprinted in the glass at lower glass viscosities. On the other hand, achieving good surface cosmetics can be done at higher glass viscosities. Thus, to achieve both good glass surface cosmetics and tight dimensional tolerances in the 3D glass article, the pressure applied to the glass by the hot pressurized gas, the glass viscosity, and the location at which the pressure of the hot pressurized gas is applied to the glass can be optimized. There are several options for obtaining tight dimensional tolerances while maintaining good glass surface cosmetics.

One option can be to use contour correction in the mold. For example, for forming 3D shapes with tight bends, the mold can be designed with walls at a tighter bend radius and steeper sidewall tangent angle than the final shape. For example, if the sidewall tangent angle of a dish to be formed is 60°, and if it is desired to form the dish at log viscosity of 9.5 P to maintain good glass surface cosmetics, then the forming process may produce a dish with sidewall tangent angle of 46°, i.e. 14° less than the desired angle, if the mold contour is not corrected. To increase the sidewall tangent angle, without lowering glass viscosity, the mold contour can be compensated to increase the sidewall tangent angle by the difference between the ideal shape and the measured angle on the formed article. In the above example, the compensated mold would have a sidewall tangent angle of 74°. It is possible to do this contour correction and achieve a glass article with uniform thickness because there is no gap between a plunger and mold to worry about, since the pressure needed to form the shape is being provided by hot pressurized gas.

Another option is to use a high degree of polish on the mold that would allow for lowering the glass viscosity without creating defects on the glass surface. The mold surface can be made to have a surface roughness of Ra<10 nm and can be made to be non-sticky or non-reactive. For example, a glassy graphite coating may be used on the mold surface. Also, the vacuum or exhaust ports can be placed in the corner of the mold only, i.e., at the location where glass would touch the mold last during the pressure forming.

Another option is to use a directional plenum, such as shown in FIG. 3, where the pressure of hot gas is directed towards complex areas, e.g., areas including bends or corners, of the glass. Pressurized gas burst at temperatures of 50° C. to 150° C. greater than the temperature of the glass can be applied as a directional puff to preferentially raise the glass temperature and lower the glass viscosity in the complex areas.

Yet another option is to use small heaters above a 3D area (i.e., the area to be formed into a 3D shape including any combination of bends, corners, and curves) of the glass sheet. For example, the glass in the 3D area may be heated 10-30° C. higher than the glass in the 2D area (i.e., the remaining area that will not be formed into a 3D shape) of the glass sheet. This can be combined with use of directional jets as described above.

Another option is to have heaters in the mold to heat a 3D area (i.e., the area to be used in forming the 3D area of the glass sheet) of the mold to a temperature higher than that of a 2D area of the mold. The 3D area of the mold may be heated to a temperature of 10-30° C. more than the temperature of the 2D area (or flat area) of the mold. This can be combined with use of directional jets as described above. Another option is to have radiant heaters above and near the 3D area of the glass sheet to apply radiant heating to the 3D area of the glass sheet, thus preferentially softening the small area of the glass sheet that needs to be made into a 3D shape while maintaining the 2D area of the glass sheet relatively colder. Keeping the 2D area colder than the 3D area allows for maintaining the pristine surface finish in the 2D area.

Figure 6:
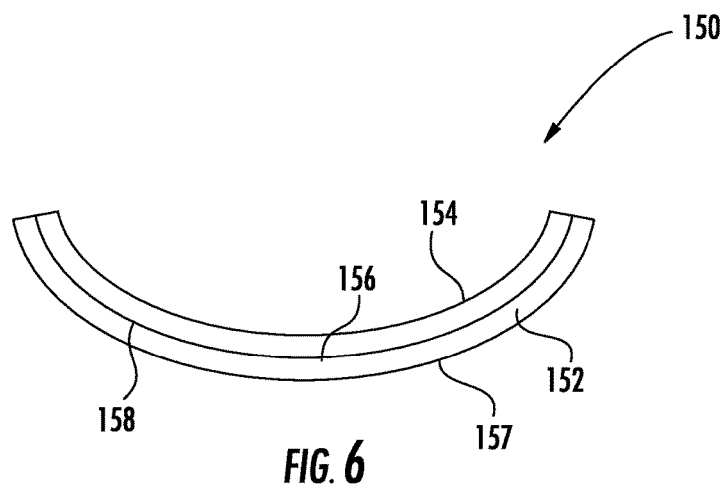
FIG. 6 is a schematic, section view of an embodiment of a 3D plastic article.

In some embodiments, as illustrated by step 138, the 3D glass article may be provided with a polymer layer, once the 3D glass article is formed. The polymer layer may be laminated using a preformed polymer sheet or by overmolding or otherwise applying (e.g., coating, spraying, etc.) the polymer layer onto the glass layer, as examples. Although glass is an inherently strong material, its strength (reliability) is a function of its surface defect or flaw size density distribution and the cumulative exposure of stress to the material over time. In some embodiments, the 3D glass article may be strengthened by adding one or more additional glass and/or non-glass layers, such as one or more polymer layers. Referring to FIG. 6 as an example, a 3D glass article 150 may include a glass layer 152 formed by the reshaped flexible glass sheet and a polymer layer 154 that is laminated to an inner surface 156 (and/or outer surface 157) of the glass layer 152. In some embodiments, an adhesive layer 158 may be used to laminate the polymer layer 154 and the glass layer 152. In some embodiments, a coefficient of thermal expansion (CTE) mismatch between the polymer layer and the flexible glass layer may be utilized by laminating the polymer layer to the flexible glass substrate at an elevated temperature followed by a slow cooling. Such an elevated temperature lamination approach can create a uniformly distributed compressive residual stress across the thickness of the flexible glass substrate once the laminate structure is cooled.

The processes for strengthening flexible glass substrates may utilize a large CTE mismatch (e.g., about 2 times or more, such as about 5 times or more, such as about 10 times or more) between the polymer layer and the 3D glass article by laminating the polymer layer and the 3D glass article at an elevated temperature and then slowly cooling to create a residual compressive stress across the thickness of the 3D glass article. In some embodiments, the CTE mismatch may be at least about 3 ppm/° C. or more, such as about 6 ppm/° C. or more, such as about 9 ppm/° C. or more, such as about 12 ppm/° C. or more, such as about 15 ppm/° C. or more, such as about 20 ppm/° C. or more, such as about 27 ppm/° C. or more, such as about 50 ppm/° C. or more.

Figure 7:
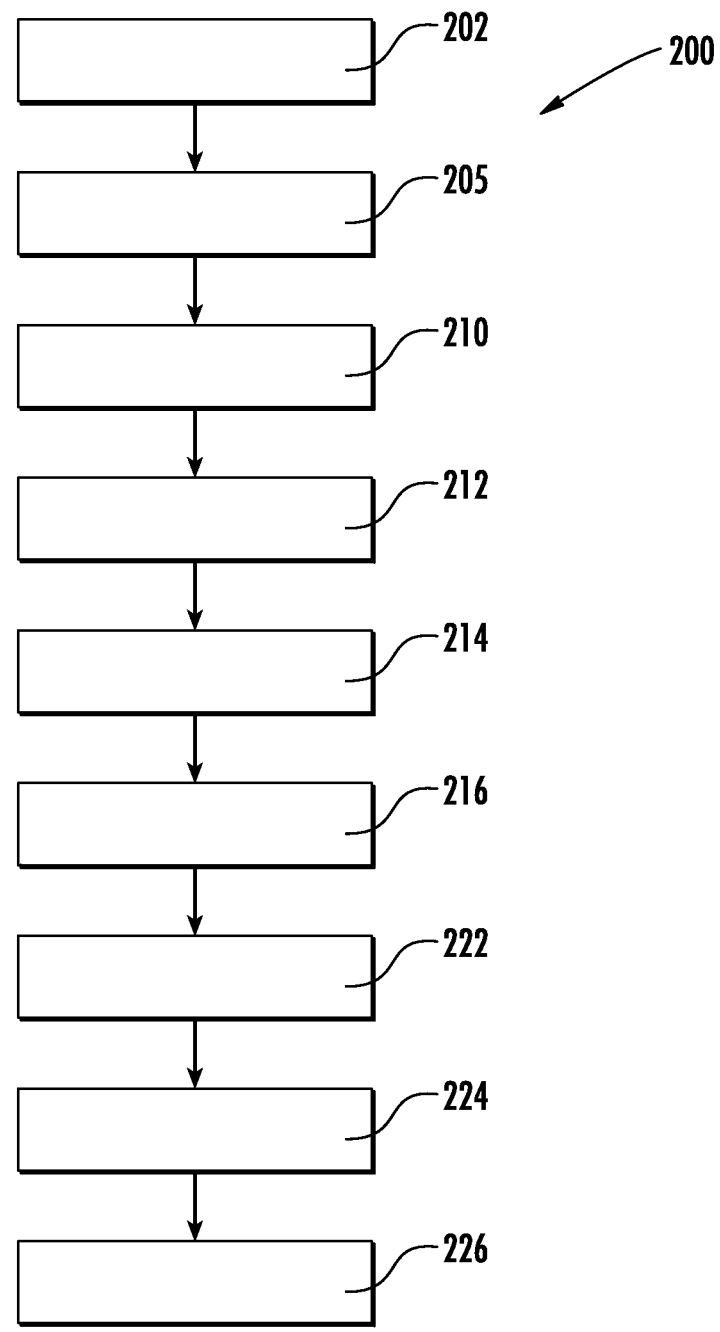
FIG. 7 illustrates another exemplary method of forming a 3D glass article.
Figure 8:
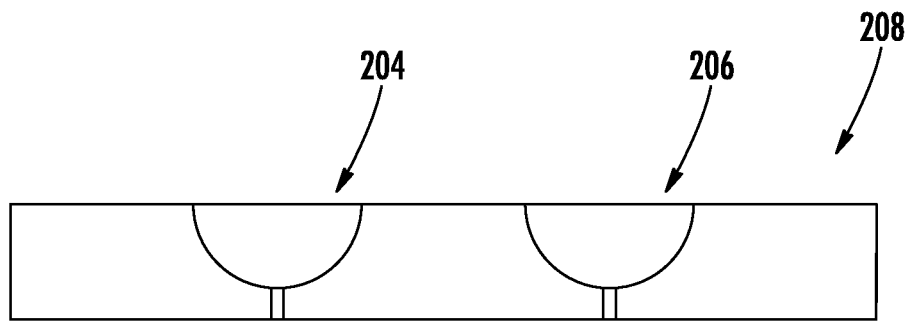
FIG. 8 is a section view of an embodiment of a mold assembly.

Referring now to FIG. 7, another embodiment of a method 200 of forming a 3D glass article is illustrated. In this embodiment, a flexible glass sheet is provided at step 202. In this embodiment, the flexible glass sheet may be sized to extend over multiple mold cavities, such as the mold cavities 204 and 206 of FIG. 8. The flexible glass sheet may be formed using any suitable process, such as a fusion draw process. The flexible glass sheet may be placed in a pressure cavity, between a mold assembly 208 and a pressure cap assembly at step 205. In some embodiments, the mold assembly 208 may be preheated, before placement of the flexible glass sheet thereon. After locating the flexible glass sheet in the pressure cavity, the flexible glass sheet may be heated using the pressure cap assembly, as described above to a forming temperature corresponding to a desired glass viscosity or viscosity range at step 210.

Referring again to FIG. 7, after heating the flexible glass sheet, a vacuum is applied to the mold cavity to draw a bottom surface of the flexible glass sheet against the mold surface and seal the flexible glass sheet to the mold surface at step 212. Hot pressurized gas is applied to the top surface of the partially-shaped flexible glass sheet from the pressure cap assembly. The hot pressurized gas provides the pressure needed to fully conform the flexible glass sheet to the mold surfaces. After forming, the flow of hot pressurized gas to the pressure cavity is stopped or replaced with flow of colder pressurized gas at step 214, the glass is cooled to below the strain point of the glass and the glass is removed from the mold cavities at step 216.

Figure 9:
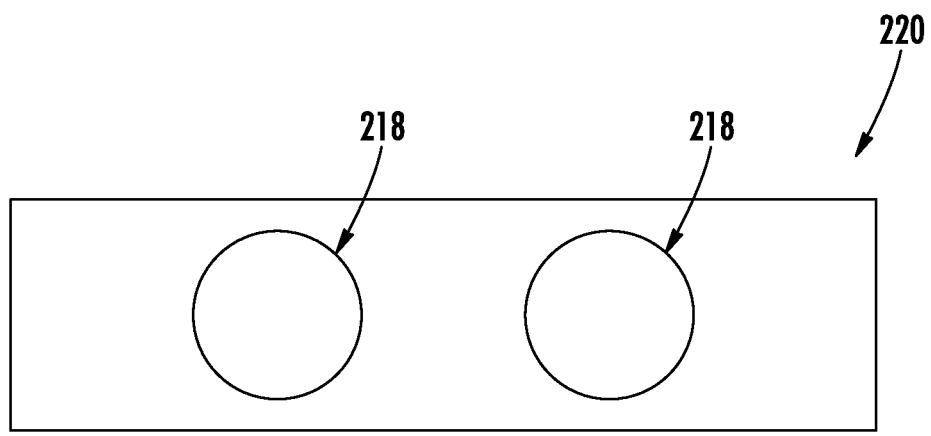
FIG. 9 is a schematic plan view of an embodiment of a glass sheet having non-planar formation molded therein.

Referring also to FIG. 9, the 3D glass articles may be formed by cutting around formed areas 218 of the glass sheet 220 at step 222. Any suitable cutting method may be used, such as laser cutting, mechanical and water jet cutting. At step 224, it may be desirable to edge strengthen the 3D glass articles, for example, through polishing, etching, edge coating, etc. In some embodiments, as illustrated by step 226, the 3D glass articles may be provided with a polymer layer, once the 3D glass articles are formed. The polymer layers may be laminated using preformed polymer sheets or by overmolding the polymer layers onto the glass layers, as examples. Adhesive layers may be used between the polymer and glass layers. In other embodiments, the polymer layer may be applied to the glass sheet 220 before cutting around the formed areas 218. In this manner, cutting around the formed areas can remove the glass articles along with their individual polymer layers.

The polymer layers for use in the 3D glass articles described herein may include various polymers, for example, any one or more of polyethylene teraphthalate (PET), polyethylene Naphthalate (PEN), ethylene tetrafluoroethylene (ETFE), ethylene vinyl acetate (EVA), or thermopolymer polyolefin (TPO™—polymer/filler blends of polyethylene, polypropylene, block copolymer polypropylene (BCPP), or rubber), polyesters, polycarbonate, polyvinylbuterate, polyvinyl chloride, polyethylene and substituted polyethylenes, polyhydroxybutyrates, polyhydroxyvinylbutyrates, polyetherimides, polyamides, polyethylenenaphalate, polyimides, polyethers, polysulphones, polyvinylacetylenes, transparent thermoplastics, transparent polybutadienes, polycyanoacrylates, cellulose-based polymers, polyacrylates and polymethacrylates, polyvinylalcohol, polysulphides, polyvinyl butyral, polymethyl methacrylate and polysiloxanes. It is also possible to use polymers which can be deposited/coated as pre-polymers or pre-compounds and then converted, such as epoxy-resins, polyurethanes, phenol-formaldehyde resins, and melamine-formaldehyde resins. Many display and electrical applications may prefer acrylic based polymers, silicones and such structural aiding layers, for example, commercially available SentryGlas® from DuPont. The polymer layers may be transparent for some applications, but need not be for other applications.

Non-limiting examples of adhesive materials for laminating the polymer layers to the 3D glass articles at elevated temperatures include UV curable optical adhesives or optical cements such as those manufactured by Norland™ Optical Adhesives (e.g., NOA60, NOA61, NOA63, NOA65, NOA68, NOA68T, NOA71, NOA72, NOA73, NOA74, NOA75, NOA76, NOA78, NOA81, NOA84, NOA88, NOA89), Dow Corning™ (e.g., Sylgard 184 and other thermally curing silicones), Dymax™, and others. For heat-activated adhesive materials (e.g., NOA83H), adhesive materials with activation temperatures of greater than a preselected temperature (e.g., about 50° C. or more, such as about 70° C. or more, such as 80° C. or more, such as 100° C. or more) may be used to allow the polymer layer an opportunity to expand relative to the glass layer prior to its lamination thereto. In some embodiments, the adhesive material comprises a pressure sensitive adhesive such as those manufactured by 3M™ (e.g., 8212, 82603, 8172C), Flexconn™ (e.g., DF132311), and others.

In some embodiments, a polymer suitable for use as the polymer layer can be used as an adhesive material. For example, in some embodiments, a polymer layer (e.g., EVA or SentryGlas®) can be used as an adhesive material between two layers (e.g., between a glass layer and a polymer layer or between two glass layers). Additionally, each of the polymer layers may itself be a laminated or composite structure made of different types of polymer having different Young's moduli, different Poisson's Ratios, and/or layer thicknesses. In this case, one of skill in the art would be able to homogenize the compound layer to find effective values for the overall layer, including an effective thickness, an effective Young's modulus, and an effective Poisson's Ratio that may be used as described herein to beneficially configure a glass-polymer laminate. The composites, for example, may be formed of any combinations of the above materials and/or metals, such as stainless steel, nickel, copper, noble metals, metal oxides, etc.

Example

Figure 10:
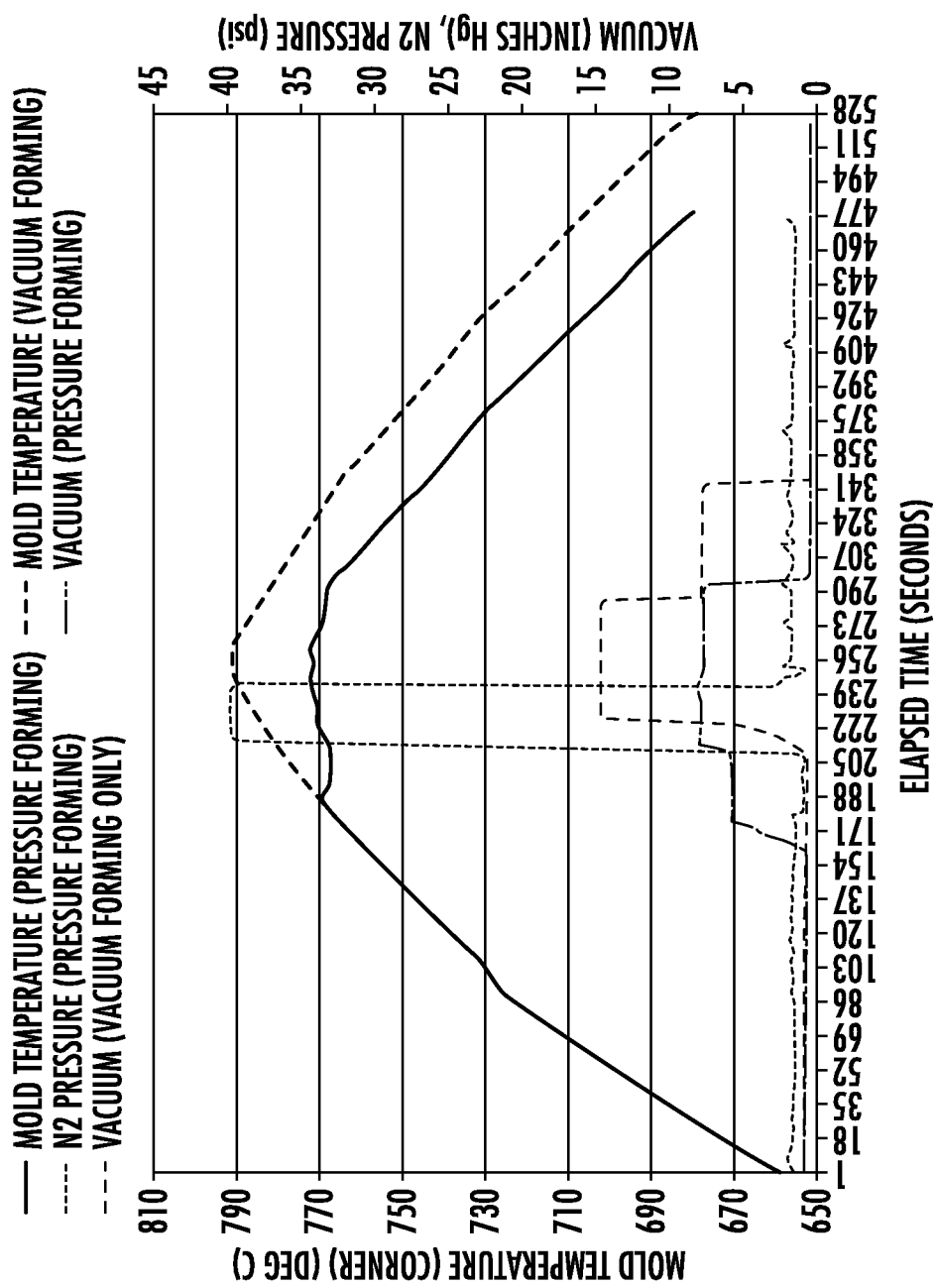
FIG. 10 illustrates exemplary time, temperature and pressure profiles for various forming operations.

A 0.2 mm flexible glass sheet was pressure formed into a 9 diopter lens blank (58.11 mm radius of curvature). A flat circular glass preform was cut first out of the flexible glass sheet and placed on a mold assembly at 660° C. The mold assembly and glass were preheated in a mid-IR furnace, which preferentially heats glass compared to the mold surface. The mold temperature profile, vacuum and pressure forming are shown in FIG. 10. When the mold temperature was 761° C. ($10^{12.2}$ P), a vacuum was applied, and the mold assembly was then moved into a pressure forming station where a pressure forming cap assembly was placed over the mold assembly. The flexible glass preform was pressurized with 40 psi of hot nitrogen for 30 seconds to fully comply to the mold surface. Pressure cap assembly temperature was 870° C. ($10^{9.5}$ P), and peak mold temperature was 773° C. ($10^{11.9}$ P). The vacuum was maintained for initial stages of cooling to prevent snap back during cooling and ensure good shape control. The formed 3D glass article was removed from the mold below annealing point, when mold temperature was 681° C. ($10^{14.5}$ P).

A vacuum forming mold temperature profile is also shown in FIG. 10 for comparison. Vacuum forming may require higher mold temperatures (792° C., $10^{11.3}$ P) because the force available to vacuum the form is less than 14 psi. The need to increase mold temperature increases cycle time and can cause more defects to be imparted to the molded glass. The mold for vacuum forming can require more vacuum holes than pressure forming molding to distribute vacuum pressure over the glass surface and achieve full forming.

3D glass articles having 4-sided bend (dish) and 2-sided bend (sled) shapes are also of interest for consumer electronics. In general, glass bending scales linearly with viscosity and with glass thickness cubed:

$$t = \left(\frac{256}{80}\right)\frac{\eta\left(\frac{s}{2}\right)^3}{P(1-v^2)R^3}\left(\frac{R}{h} - 0.23\right)$$

where,
- t=time to bend glass (seconds)
- h=glass viscosity (Pas)
- s=glass sheet thickness (m)
- P=bending pressure (Pa)
- υ=Poisson ratio
- R=bend radius (m)
- H=bend height (m).

Thus with all other parameters the same (viscosity, glass geometry) forming of a glass sheet with 0.2 mm thickness can be done about 40 times faster than 0.7 mm glass sheet, or alternatively a glass sheet can be formed at a proportionally lower viscosity with the same forming time. Pressure forming shapes for consumer electronics covers from flexible thin glass and laminating with plastic to achieve desired thickness of 0.55-1.0 mm can be advantageous compared to simply forming a final glass sheet shape because thin glass can be shaped at higher viscosity, thus distortion and surface defect level can be reduced, time on mold is reduced, and hence mold life and throughput can be increased. It should be noted that 2-sided bend shapes can be formed by cutting bend sides from a 4-sided bend shape.

Figure 11:
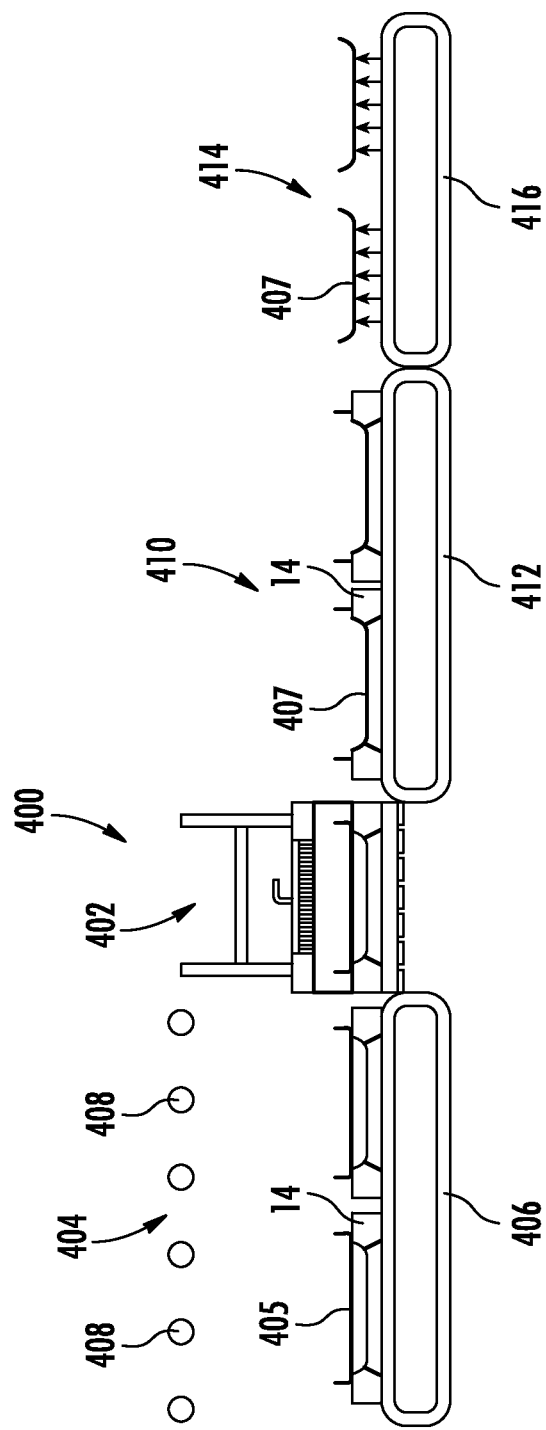
FIG. 11 is a schematic view of an embodiment of a continuous process for forming 3D glass articles.

FIG. 11 shows a continuous system 400 for forming 3D glass articles from 2D flexible glass sheets. The system 400 includes a forming station 402. The forming station 402 includes the apparatus 10 (FIG. 2). The system 400 includes a preheating station 404 upstream of the forming station 402. Mold assemblies 14 carrying flexible glass sheets 405 are preheated at the preheating station 404. The mold assemblies 14 are transported along the preheating station 404 to the forming station 402 on a conveyor 406. The preheating station 404 includes heaters 408 for heating the flexible glass sheets 405 carried by the mold assemblies 14. The heaters 408 may be mid-IR heaters, as described above, or other types of heaters capable of delivering heat to the flexible glass sheets and mold assemblies 14 and providing a temperature differential between the flexible glass sheets 405 and the mold assemblies 14. The system 400 may include a cooling station 410 downstream of the forming station 402. Three-dimensional glass articles 407 formed at the forming station 402 are carried to the cooling station 410 and allowed to cool down to a temperature at which they can be removed from the mold without distortion of the shape (i.e., glass temperature is below the transition temperature of the glass). Active cooling can be applied to the mold assemblies 14 in cooling station 410 so that the mold assemblies 14 are cooled from the bottom by a heat transfer fluid or gas, allowing the mold temperature to match the air temperature above the glass to minimize the delta T across the glass thickness. Initial cooling of the 3D glass articles 407 may also occur at the forming station 402. The mold assemblies 14 may be transported along the cooling station 410 on a conveyor 412. The system 400 may also include an annealing station 414 downstream of the cooling station 410. The annealing station 414 may include a hot air bearing 416, and the 3D glass articles 407 may be annealed by floating on the hot air bearing 416. Pick-up devices may be used to pick up the 3D glass articles 407 from the mold assemblies 14 and place the 3D glass articles 407 on the hot air bearing 416.

Figure 12:
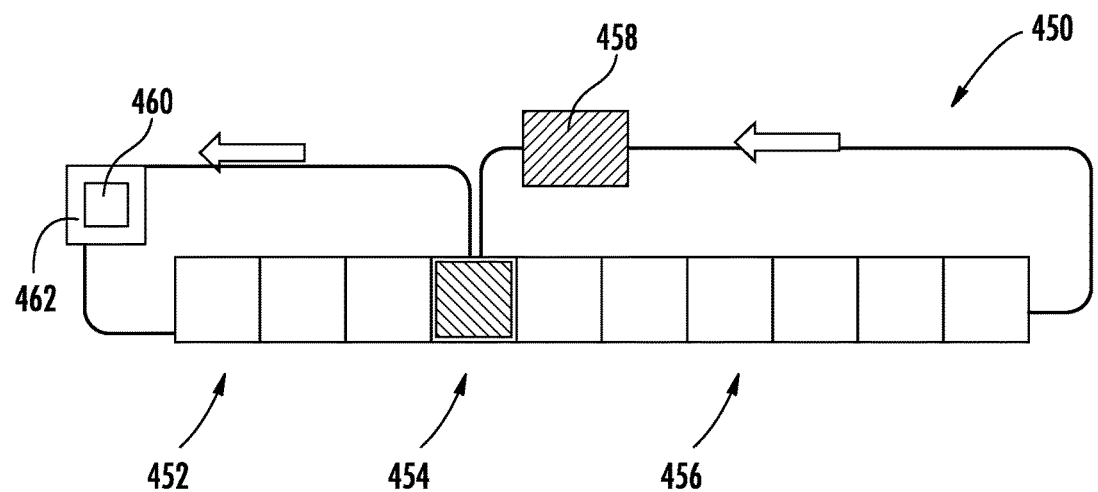
FIG. 12 is a schematic view of another embodiment of a continuous process for forming 3D glass articles.
Figure 13:
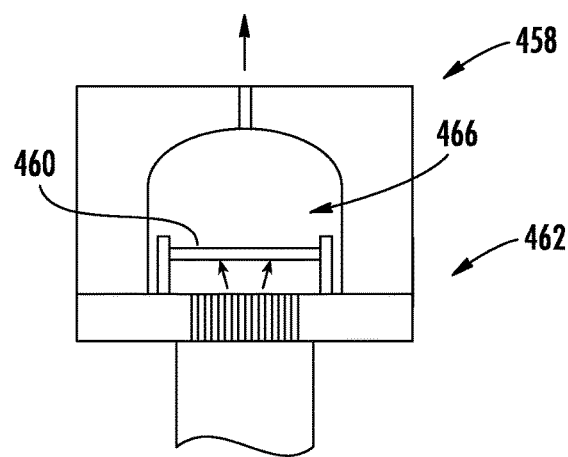
FIG. 13 is a schematic illustration of an air bearing engaged with a mold assembly for use in the process of FIG. 12.

Referring now to FIG. 12, another continuous system 450 for forming 3D glass articles from 2D flexible glass sheets is illustrated. The system 450 generally includes preheat furnace modules 452, a pressure forming station 454 and controlled cooling furnace modules 456. In this embodiment, mold assemblies 458 preheated without glass in the indexed of continuous furnace loop 450 to avoid being preheated along with the flexible glass sheets 460. The flexible glass sheets 460 can be carried by air bearings 462 that travel in a conveyor-like fashion or on a mold stem with air bearing through the preheat furnace modules 452, which may include mid-IR heaters for heating the flexible glass sheets 460 to a desired temperature. The mold assemblies 458 may engage the air bearings 462 at the pressure forming station 454 for an article forming operation. Referring briefly to FIG. 13, the mold assembly 458, here with its mold cavity facing downward, is illustrated engaged with the air bearing 462 forming a mold cavity 466 therebetween. A vacuum may be used to draw the flexible glass sheet 460 into the mold cavity 466 to conform to the shape of the mold cavity 466 with the flexible glass sheet 460 being heated to a forming temperature greater than that of the mold assembly 458. Referring back to FIG. 12, the three-dimensional glass articles formed at the forming station 454 are carried to the cooling station 456 on the mold assemblies 458 and allowed to cool down to a temperature at which they can be removed from the mold assemblies 458 without distortion of the shape.

Embodiments described herein relate generally to forming 3D glass articles from 2D glass sheets using hot pressurized gas that is delivered from a pressure cap assembly that is at a greater temperature than a mold temperature to provide radiative heating of the glass sheet during the forming process. The 3D articles may be provided with a polymer layer that is laminated or otherwise applied to a surface of the 3D article. The polymer layer may be used to strengthen the glass layer and/or for other uses, such as to provide a decorative pattern or to provide other properties such as UV protection. The 3D formed glass articles can be coated prior to or after lamination with a suitable dielectric or organic coating to increase resistance to static fatigue, scratch resistance or for anti-reflective properties.

It should be emphasized that the above-described embodiments, particularly any "preferred" embodiments, are merely possible examples of implementations, merely set forth for a clear understanding of various principles of the disclosure. Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A method of forming a 3D glass article from a glass sheet, the method comprising:
   locating the glass sheet on a mold body comprising a mold surface with a 3D surface profile corresponding to that of the 3D glass article, the glass sheet comprising a thickness of less than about 0.275 mm;
   heating the glass sheet to a forming temperature that is greater than a temperature of the mold body; and forcing the heated glass sheet onto the mold surface to conform the glass sheet to the mold surface by applying a pressurized gas to a first surface of the glass sheet opposite the mold surface with the glass sheet at the forming temperature that is greater than the temperature of the mold body.

2. The method of claim 1, wherein the glass sheet is a flexible glass sheet comprising the thickness of no more than about 0.2 mm.

3. The method of claim 1, wherein the step of forcing the heated glass sheet onto the mold surface comprises applying a vacuum to a second surface of the glass sheet opposite the first surface.

4. The method of claim 1, wherein the pressurized gas is heated.

5. The method of claim 1, further comprising sealing the mold body with a pressure cap assembly to form a pressurized chamber therebetween, wherein the pressurized gas is between about 10 psi and about 60 psi.

6. The method of claim 5 further comprising heating the pressure cap assembly to a temperature of between about 800° C. and about 950° C. thereby radiatively heating the glass sheet.

7. The method of claim 5, further comprising positioning a heating element within the pressure cap assembly and above the pressurized chamber.

8. The method of claim 1, wherein the forming temperature of the glass sheet is at least about 25° C. higher than the temperature of the mold surface during the step of forcing the heated glass sheet onto the mold surface.

9. The method of claim 1, wherein the forming temperature of the glass sheet is between about 25° C. and about 100° C. higher than the temperature of the mold surface during the step of forcing the heated glass sheet onto the mold surface.

10. The method of claim 1, further comprising cooling the glass sheet after the step of forcing the heated glass sheet onto the mold surface to form the 3D glass article.

11. The method of claim 10 further comprising applying a polymer layer to the 3D glass article.

12. The method of claim 11, wherein the step of applying the polymer layer comprises laminating the polymer layer to the 3D glass article at an elevated temperature followed by cooling the polymer layer and the 3D glass article to create a uniformly distributed compressive residual stress across the thickness of the 3D glass article.

13. The method of claim 11, wherein the step of applying the polymer layer comprises mismatching a coefficient of thermal expansion (CTE) between the polymer layer and the 3D glass article.

14. The method of claim 13, wherein a CTE mismatch between the polymer layer and the 3D glass article is at least 3 ppm/° C.

* * * * *